(12) United States Patent
Harris et al.

(10) Patent No.: US 7,839,491 B2
(45) Date of Patent: Nov. 23, 2010

(54) LASER MEASUREMENT DEVICE AND METHOD

(75) Inventors: Michael Harris, Worcestershire (GB); Martin Johnson, Worcestershire (GB); Richard Paul Scullion, Worcestershire (GB)

(73) Assignee: Qinetiq Limited (GB)

( * ) Notice: Subject to any disclaimer, the term of this patent is extended or adjusted under 35 U.S.C. 154(b) by 367 days.

(21) Appl. No.: 11/997,088

(22) PCT Filed: Jul. 28, 2006

(86) PCT No.: PCT/GB2006/002847
§ 371 (c)(1),
(2), (4) Date: Jan. 28, 2008

(87) PCT Pub. No.: WO2007/012878
PCT Pub. Date: Feb. 1, 2007

(65) Prior Publication Data
US 2008/0210881 A1 Sep. 4, 2008

(30) Foreign Application Priority Data
Jul. 29, 2005 (GB) .................................. 0515605.4

(51) Int. Cl.
*G01C 3/08* (2006.01)
(52) U.S. Cl. ..................................... 356/4.01; 356/5.01
(58) Field of Classification Search ................ 356/4.01, 356/5.01, 5.15, 28; 342/70–73
See application file for complete search history.

(56) References Cited

U.S. PATENT DOCUMENTS

| | | | |
|---|---|---|---|
| 4,931,767 A | 6/1990 | Albrecht et al. | |
| 5,119,002 A * | 6/1992 | Kato et al. | 318/444 |
| 5,515,156 A * | 5/1996 | Yoshida et al. | 356/5.01 |
| 6,691,003 B1 | 2/2004 | Stortz et al. | |
| 2009/0015824 A1* | 1/2009 | Shubinsky et al. | 356/237.3 |

FOREIGN PATENT DOCUMENTS

| | | |
|---|---|---|
| DE | 196 45 078 | 5/1998 |
| DE | 198 50 639 | 5/1999 |
| DE | 197 17 399 | 6/1999 |
| DE | 101 36 138 | 2/2003 |
| DE | 101 51 981 | 4/2003 |
| DE | 103 32 939 | 2/2005 |

(Continued)

*Primary Examiner*—Isam Alsomiri
(74) *Attorney, Agent, or Firm*—McDonnell Boehnen Hulbert & Berghoff LLP (57) ABSTRACT

A measurement device, such as a laser radar, is described that comprises a transmitter portion for transmitting radiation to a remote probe volume, a receiver portion for detecting radiation returned from the remote probe volume and a processor for analysing the detected return radiation. The device is suitable for transmitting and receiving radiation through a window portion having associated window cleaning apparatus (e.g. wiper 62) for cleaning said window portion in response to a cleaning activation signal. The processor is arranged to generate a cleaning activation signal for activating window cleaning apparatus when the properties of said detected return radiation are indicative of a reduction in transmission through at least part of said window portion. In one embodiment, a conically scanned lidar is described that generates a cleaning activation signal when the power of detected return radiation varies as a function of the angle of transmission of radiation from the device.

20 Claims, 5 Drawing Sheets

FOREIGN PATENT DOCUMENTS

| | | |
|---|---|---|
| EP | 0 479 169 | 4/1992 |
| EP | 1302 784 | 4/2003 |
| JP | 9024278 | 2/1984 |
| JP | 5232045 | 9/1993 |
| WO | WO 2004/015446 | 2/2004 |
| WO | WO 2004/025324 | 3/2004 |
| WO | WO 2004/034084 | 4/2004 |
| WO | WO 2004/053518 | 6/2004 |
| WO | WO 2005/008284 | 1/2005 |
| WO | WO 2005/114253 | 12/2005 |

* cited by examiner

LASER MEASUREMENT DEVICE AND METHOD

BACKGROUND OF THE INVENTION (1) Field of the Invention

The present invention relates to laser measurement devices, such as scanned laser radar (lidar) devices for anemometry and the like, and in particular to such laser measurement devices that are suitable for incorporation in a weatherproof housing.

(2) Description of the Art

Lidars are well known and have been used to measure wind profiles for many years. The basic principle of a lidar device is to direct a laser beam to a point or region in space and to detect the returned signal. Measurement of the Doppler shifted light back-scattered by small natural particles and droplets (aerosols) present in the atmosphere is used to provide a measure of the line of sight wind speed. In such devices the laser beam is typically scanned to enable wind velocity components to be measured at multiple points in space thereby allowing the wind vector at a remote probe volume to be calculated.

An example of an early, carbon dioxide laser based, lidar is described in Vaughan, J M et al: "Laser Doppler velocimetry applied to the measurement of local and global wind", Wind engineering, Vol. 13, no. 1, 1989. More recently, optical fibre based lidar systems have also been developed; for example, see Karlsson et al, Applied Optics, Vol. 39, No. 21, 20 Jul. 2000 and Harris et al, Applied Optics, Vol. 40, pp 1501-1506 (2001). Optical fibre based systems offer numerous advantages over traditional gas laser based systems. For example, optical fibre based systems are relatively compact and can be fabricated using standard telecommunication components which are moderately priced and typically very reliable.

Following the recent increase in the exploitation of wind power, there is now a requirement for anemometers that are capable of making reliable wind speed measurements over prolonged periods of time (e.g. weeks or months). These routine wind speed measurements may be used to assess the suitability of proposed wind turbine sites, to measure the power extraction efficiency of existing wind turbines or even to form part of a wind turbine control system. Plans to locate wind farms off-shore has also led to a requirement to make long term, unattended, wind speed measurements away from land and WO2005/008284 (QinetiQ Ltd) describes a lidar device mounted on a buoy for deployment off-shore.

To prolong device lifetime and to minimise maintenance requirements, any commercially viable lidar device intended for outdoor use will be located within a weatherproof container. Typically, such a container will include a single optically transparent window through which radiation is both transmitted and received. For example, WO2005/008284 describes a lidar system mounted inside a buoy that has a glass window for the transmission and collection of radiation. WO2005/008284 also describes how the periodic use of a simple wiper system, or a wash-wipe system, can keep the window clear of debris. However, the activation of a wiper system requires energy from the batteries of the device and the device can only carry a finite amount of washer fluid. Overuse of a wash-wipe cleaning mechanism will thus deplete the energy and washer fluid reserves of the device thereby decreasing the time between maintenance interval. On the other hand, if the wash-wipe system is used too infrequently there may be a build up of dirt on the external window that could result in the loss, or a reduction in quality, of acquired wind speed data.

SUMMARY OF THE INVENTION

It is thus an object of the present invention to provide a laser device suitable for use in a weatherproof housing that mitigates at least some of the above described disadvantages. It is a further object of the invention to provide a weatherproof laser radar device having an reduced need for maintenance.

According to a first aspect of the invention a measurement device comprises a transmitter portion for transmitting radiation through a window portion to a remote probe volume, a receiver portion for detecting radiation returned through said window portion from the remote probe volume and a processor for analysing the detected return radiation, said window portion having associated window cleaning apparatus for cleaning said window portion in response to a cleaning activation signal, characterised in that the processor is arranged to generate a cleaning activation signal for activating window cleaning apparatus when the properties of said detected radiation returned from the remote probe volume are indicative of a reduction in transmission through at least part of said window portion.

In this manner, the measurement device itself (e.g. a laser anemometer) is arranged to not only take the required remote measurement (e.g. wind speed) but also performs the task of monitoring the returned "back-scattered" radiation for any changes that indicate a reduction in transmission through at least part of an associated window portion. A measurement device of the present invention thus allows the window cleaning apparatus (e.g. a wash-wipe system) of any associated weatherproof mechanism to be activated only when necessary to clear the window portion of dirt and the like. The interval between window cleaning operations is thus optimised and the device ensures the window portion is kept clear of debris whilst minimising use of cleaning resources such as power and washer fluid.

It should be noted that the above advantages are achieved without the requirement for additional monitoring equipment, such as a standalone transmission sensor. Analysis of the back-scattered radiation signal already received by the measurement device is used to obtain the required measurement (e.g. wind speed) and also to determine when the window portion needs to be cleaned. A device of the present invention is thus highly suited to long term, unattended, acquisition of measurements.

Advantageously, the device comprises means for directing radiation to a plurality of points within the remote probe volume. Preferably, the means for directing radiation comprises a scanning mechanism. The device can thus emit radiation in, and/or receive radiation from, a plurality of different directions. The device may have a number of fixed "look" directions or the device may comprise a scanning mechanism for performing an angular scan of the beam of radiation within the remote probe volume. Although any scan pattern could be employed, a conical scan is typically used as described below. As described in WO2005/008284 a random or pseudo-random scan could also be used provided that the look direction is known with sufficient accuracy.

Advantageously, the processor is arranged to generate a cleaning activation signal when the power of detected return radiation varies as a function of the angle of transmission of radiation from the device. In other words, the device is arranged to monitor the power of returned radiation as a function of the angle of the transmit/receive beam and to provide a cleaning activation signal when there are substantial angular variations in the power of the return signal. Any angular variations in return power are likely to be due to dirt or "crud" that contaminates part of the window portion thereby reducing the transmission of radiation through that part of the window.

It should be noted that, in the case of a Doppler lidar, the return power of each measurement would be in the form of a Doppler power spectrum (i.e. return power as a function of Doppler shift). In such a case, the power of all returned light would be calculated (e.g. by integrating over the Doppler spectrum) and used by the processor as the return power. It should be noted that the transmit portion may transmit either continuous wave (CW) or pulsed radiation. Where pulsed radiation is transmitted the term power shall be taken to mean the energy of the detected signal pulse.

Advantageously, the processor is arranged to determine the average return power of detected return radiation collected from each of a plurality of mutually exclusive angular segments, each angular segment corresponding to a range of angles of transmission of radiation from the device. In other words, each acquired return power measurement made by the device may be allocated to an angular segment and the average return power can then calculated for each angular segment. The average may be taken over a single scan, over a defined number of scans or for a defined period of time. Alternatively, or additionally, a running average power calculation could be performed for each segment.

Preferably, the plurality of angular segments comprises at least 2 segments, at least 3 segments, at least 4 angular segments, at least 5 segments, at least 8 segments, at least 10 segments, at least 15 segments or at least 20 segments. The angular range of a segment may be identical, or different, to the angular range of other segments. Although the segments are preferably mutually exclusive, overlapping segments could be used if desired.

Talking the example of a conically scanned laser anemometer that is described in more detail below, the angle of transmission/reception could be divided into eight equal angular segments each encompassing a 45° angular range. The return radiation detected by the receiver portion would then be allocated to the appropriate angular segment and an average (mean) return power value determined for each segment from the measurements allocated to that segment.

A number of different techniques could then be employed by the processor to identify regions of reduced transmission on the window portion. Advantageously, the processor is arranged to determine a first angular segment having the highest average return power and a second angular segment having the lowest average return power, wherein the processor generates a cleaning activation signal if the average return power of the first angular segment substantially exceeds the average return power of the second angular segment. Preferably, the cleaning activation signal is produced if the average return power of the first angular segment exceeds the average return power of the second angular segment by a factor greater than two. Although a factor of two provides good discrimination, the skilled person would recognise that the exact value of such a factor could be optimised as required for different situations.

In such a min/max arrangement, the processor looks for a substantial difference in the minimum and maximum average return power values calculated for the various angular segments. As noted above, the time over which the average values are determined could be set as required.

Alternatively, the processor may be arranged to calculate the standard deviation of the average return power for each segment from the mean average return intensity of all segments, wherein a cleaning activation signal is produced if the standard deviation exceeds a predetermined value. An increase in the standard deviation of the average return intensity indicates that there is a reduced return intensity for one or more angular segments. The skilled person would also appreciate the numerous alternative techniques for assessing a variation in the average return intensity as a function of angular segment.

Although the processor could use the raw return power data, the processor may advantageously be arranged to determine the normalised return power for each measurement, said normalised return power being calculated from the power of the detected return and an associated return power reference value.

The reference power value may be determined at system initialisation or at system start-up. It may also be measured periodically or continually updated (e.g. a rolling average may be used). The advantage of using such a normalisation process is that any effects that are associated with objects entering the field of view of the device are reduced. For example, the normalisation process will remove effects associated with objects (e.g. vehicles) that are temporarily located in the vicinity of the device and increase (or reduce) the power of the detected signal. Normalisation of this type will also ensure that a cleaning activation signal is not continually produced in the presence of persistent dirt on the window portion that can not be removed by the particular associated window cleaning mechanism.

If required, the processor may analyse both the normalised return power data and the raw return power data. In such a case, the raw data could be monitored for the presence of a persistent reduction in the power return for an angular segment. If such a persistent reduction in the intensity of the raw data is detected, the processor could be arranged to generate an error signal to signify the presence of an external object (e.g. a vehicle) or the presence of dirt on the window portion that can not be removed by the window cleaning mechanism. In parallel, normalised power data could also be generated using periodically acquired reference power data. Analysis of the normalised power data would have the advantages described above; namely that the cleaning activation signal would not be continually produced in the presence of persistent dirt or an object entering the field of view of the device. Such an arrangement would thus allow the cleaning activation signal to be produced as necessary, would not deplete reserves in an attempt to remove persistent dirt and would also provide a flag (i.e. the error signal) that indicates a potential problem with the acquired measurements.

The unpredictability associated with device operation in remote regions, or at sea, means that there is the possibility that processing techniques may be fooled into continually generating a cleaning activation signal. Although the various techniques described above can mitigate the chances of such an occurrence, the processor is advantageously arranged to output an error signal if a cleaning activation signal is persistently generated. The device may also comprise a communication means for contacting a remote centre to communicate that such an error signal has been generated.

The communication means may be a GSM (i.e. mobile phone) apparatus or a radio link. Other data may also be passed over the communications link; for example, acquired measurements, battery status, the level of any fluid reserves etc.

Conveniently, the device is monostatic. In other words, the receiver portion and transmitter portion share common optics that form substantially parallel and overlapping transmit and receive beams. Furthermore, the focus of the transmit and receive beams is always coincident when such a monostatic arrangement is used. The transmit and receive beams will thus always pass through the same part of the window portion.

Alternatively, the device could be bistatic. In this case, the transmitter and receiver comprise discrete and separate optical arrangement. For such a bistatic system, it is preferred to ensure the transmit and receive beams are focussed at the same range and also that the two beams intersect at their points of focus. A device comprising means for simultaneously altering the focus and "squint" of a bistatic arrangement is described in PCT patent application GB03/04408. In such an arrangement, the transmit and receive beams may pass through slightly different part of the window portion.

Advantageously, the processor is arranged to determine any Doppler shift of return radiation detected by the receiver portion. The returned (back-scattered) light collected by the receiver portion may be mixed with a local oscillator signal extracted from the light source of the transmitter prior to detection. In this manner, a heterodyne detection system is provided. This allows the Doppler shift data to be readily extracted from the beat frequency of the local oscillator and returned (i.e. back-scattered) light.

Conveniently, the transmitted beam of light comprises infrared radiation. For example, the device could incorporate a solid state laser and may be arranged to operate at the 1.55 μm telecommunications wavelength. It should also be noted that herein the term "light" is used to describe visible and non-visible radiation of any wavelength from the deep ultraviolet to the far infra-red. The lidar may be arranged for CW or pulsed operation.

Preferably, the transmitter and receiver comprise optical components linked by optical fibre. Preferably, the device comprises at least one piece of optical fibre. Fibre based systems of this type can be fabricated using "off the shelf" optical components and are relatively cheap, robust and reliable.

Conveniently, the processor is arranged to calculate wind speed from the Doppler shift of backscattered radiation collected by the receiver portion. In other words, the device may be a laser anemometer. Alternatively, the invention could be applied to a laser device that directed radiation to a remote probe volume in space. For example, a differential absorption lidar (DIAL) device of the type described in WO2004/025324 and WO2004/053518 or a vibrometry device.

Advantageously, the processor is arranged to analyse the Doppler power spectrum of each measurement for the presence of rain. This may comprise determining the "spikiness" of each Doppler spectrum using any one of a number of mathematical functions. In this manner the "spikiness" properties of said detected return radiation provide an indication that rain is likely to reduce transmission through at least part, and probably all, of said window portion. The window cleaning mechanism can then be activated accordingly.

The rain detection technique may be used in combination with other measures of transmission through the window portion. In the example of, say, a conically scanned laser anemometer the rain detection technique may be used in conjunction with the technique described above for determining angular variations in the power of return radiation. The cleaning activation signal may then be triggered by either rain detection or angular transmission variations.

Advantageously, a weatherproof device comprises a device of the type described above and a weatherproof housing. The weatherproof housing preferably comprises a substantially transparent window portion and a window cleaning mechanism wherein the device is arranged to transmit and receive radiation through the window portion of the weatherproof housing. The window portion of the weatherproof housing may comprise a single piece of substantially transparent material, or it may comprise a plurality of pieces of such material. It should also be noted that the window portion should be substantially transparent at the wavelength of device operation. The window portion may be designed to block wavelengths outside of the wavelength of operation to prevent excessive internal heating of the system and/or saturation by other sources of light (e.g. sunlight).

The weatherproof housing may be a bespoke container designed specifically for the measurement device. For example, a toughened casing or a buoy may be built to hold the device. Alternative, the weatherproof housing may be part of another article. For example, the measurement device may be located in the cabin of a ship or inside the nacelle or hub of a wind turbine. In this latter example, the window portion and/or window cleaning mechanism may be an existing part of the housing (e.g. the ship or wind turbine) or it may be added to the housing as required.

Conveniently, the device is arranged for ground based, upwardly directed, operation. In other words, the device is arranged to be pointed substantially vertically and to measure the wind velocity in a remote probe volume located a certain height above the ground. Alternatively, the device may also be arranged for off-shore use (e.g. on a buoyant platform) or for airborne use.

Advantageously, the window cleaning mechanism comprises a wash and wipe mechanism. Alternatively, the window cleaning mechanism could comprise a substantially transparent plastic film and a means for rolling the film across the external window surface. Numerous other type of cleaning mechanism would be known to those skilled in the art.

It should be noted that in the simplest case the window cleaning mechanism receives a cleaning activation signal that initiates a cleaning action (e.g. wash-wipe). However, the window cleaning mechanism may also be arranged to receive (and the processor arranged to generate) a cleaning activation signal containing instructions to perform one or more of a plurality of cleaning actions. For example, the cleaning activation signal may contain either a wipe command or a wash-wipe command. The processor can then activate a wipe only action (e.g. if rain is detected) or a wash-wipe action (e.g. if crud is detected) as required.

The processor may also be arranged to receive additional information when determining whether a cleaning activation signal is to be generated or the type of cleaning activation signal to apply to the cleaning mechanism. For example, the processor may receive information about the available fluid reserves and/or the available power reserves and/or the time until the next scheduled maintenance event. The criteria for generating a cleaning activation signal may thus take into account this additional information. For example, the threshold for generating a cleaning activation signal may be increased as fluid and energy reserves become depleted.

Alternatively, if fluid reserves alone become depleted the use of a wipe only action may be used several times and the wash-wipe action only initiated if wiping alone fails to resolve the problem.

According to a second aspect of the invention, a method of acquiring a measurement comprising the steps of; (i) transmitting radiation to a remote probe volume, (ii) detecting radiation returned from the remote probe volume, and (iii) analysing the detected return radiation, wherein steps (i) and (ii) comprise transmitting and receiving radiation through a window portion having associated window cleaning apparatus for cleaning said window portion in response to a cleaning activation signal, characterised in that step (iii) comprises generating a cleaning activation signal for activating window cleaning apparatus when the properties of said detected return radiation are indicative of a reduction in transmission through at least part of said window portion.

The invention will now be described, by way of example only, with reference to the following drawings in which.

DESCRIPTION OF FIGURES

DESCRIPTION OF A PREFERRED EMBODIMENT

Figure 1:
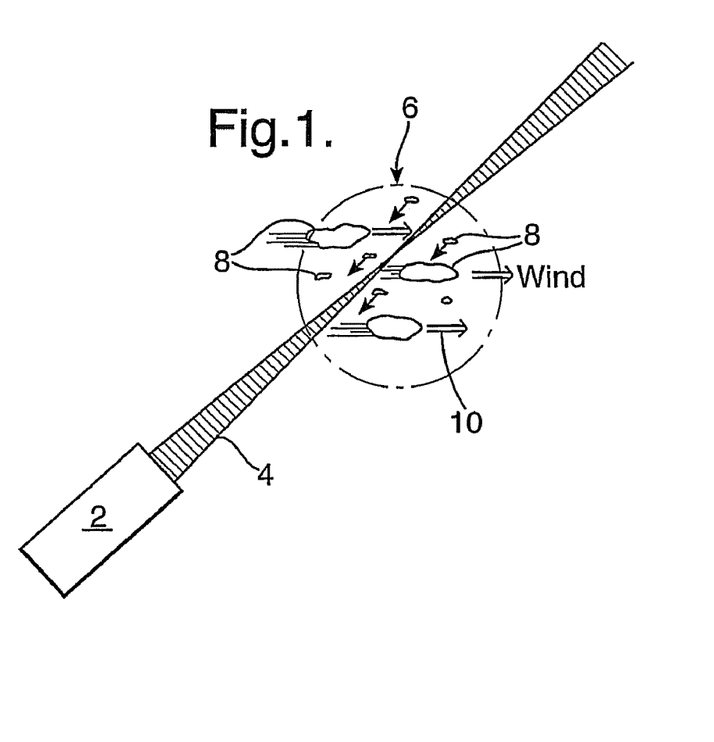
FIG. 1 illustrates the basic principle of Doppler wind lidar operation.

Referring to FIG. 1, the basic principle of Doppler wind lidar operation is shown. A coherent lidar device 2 is arranged to direct a laser beam 4 to a certain area, or so-called probe volume 6, in space. Laser radiation back-scattered from atmospheric aerosols (dust, pollen, pollution, salt crystals, water droplets etc) 8 which are carried by the wind in the direction 10 through the probe volume are then detected by the lidar device 2. Measurement of the Doppler frequency shift of the backscattered radiation is achieved by beating (heterodyning) the return signal with a stable local-oscillator beam derived from the laser providing the transmit beam. The Doppler shifted frequency is directly proportional to wind speed, and the lidar thus needs no calibration. More detail about the specific construction of such lidar apparatus can be found elsewhere; for example, see Karlsson et al or Harris et al (ibid) the contents of which are hereby incorporated herein by reference thereto.

The coherent lidar device 2 is monostatic; i.e. it has common transmit and receive optics. Adjustment of the combined transmit/receive beam focus allows the range to the probe volume 6 of the device to be controlled. It should be noted that so-called bistatic lidar systems are also known which have separate transmit and receive optics. In bistatic systems, the transmitted and received beam foci are arranged to coincide with the location of beam intersection. In bistatic systems it is preferable to alter both the focus of the transmit and receive beams and also the "squint" of the system when adjusting the range of the device. It should be noted that herein the term "receive beam" is used to denote the region from which any returned light will be directed to the detector. In other words the receive beam is not a beam of photons, but simply a pseudo or virtual beam that defines the volume from which light is received by the system.

Figure 2:
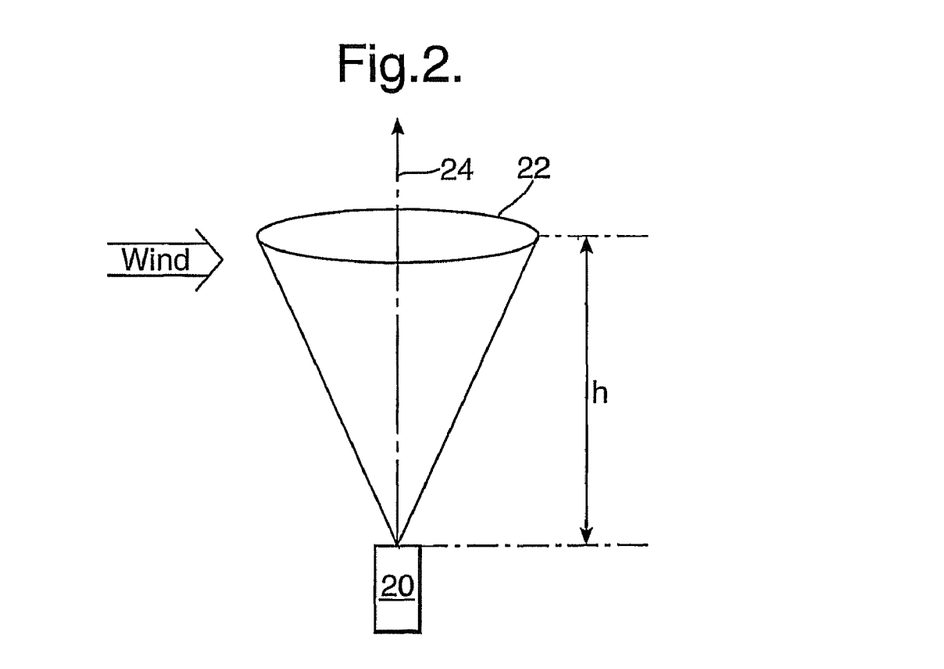
FIG. 2 shows a schematic illustration of a upward pointing, conically scanned wind lidar system in operation.

Referring to FIG. 2, an upwardly pointing, conically scanned ground based lidar 20 system is shown. In use, the device performs a continuous conical scan 22 about the vertical axis 24 to intercept the wind at a range of angles. This enables horizontal wind speed and direction to be calculated as described in more detail below. Furthermore, adjustment of the laser focus enables wind to be sampled at a range of heights (h) above ground level.

Although only conically scanned lidars are described hereinafter, it should be noted that many other scanning patterns, fixed multiple beam schemes or switched staring beam schemes could be used to determine the true wind velocity vector. As described in our international patent application WO2005/008284, random or pseudo-random scanning is also possible provided that the pointing (or look) direction associated with each line of sight velocity value is known with a sufficient degree of accuracy.

To extract Doppler information, the electrical output of the detector of the lidar system is digitally sampled at 50 MHz and the Doppler spectrum is acquired as a 512-point fast Fourier transform (FFT). Next, 256 of these individual FFTs are averaged to produce each wind or Doppler spectrum; this represents a measurement time of 2.6 ms. The atmosphere is effectively frozen on this timescale so that the spectrum displays the instantaneous spatial variation of line-of-sight wind velocity through the probe volume. Spectra are produced at a rate of around twenty-five per second, corresponding to an overall duty cycle of around 6.5%.

Figure 3:
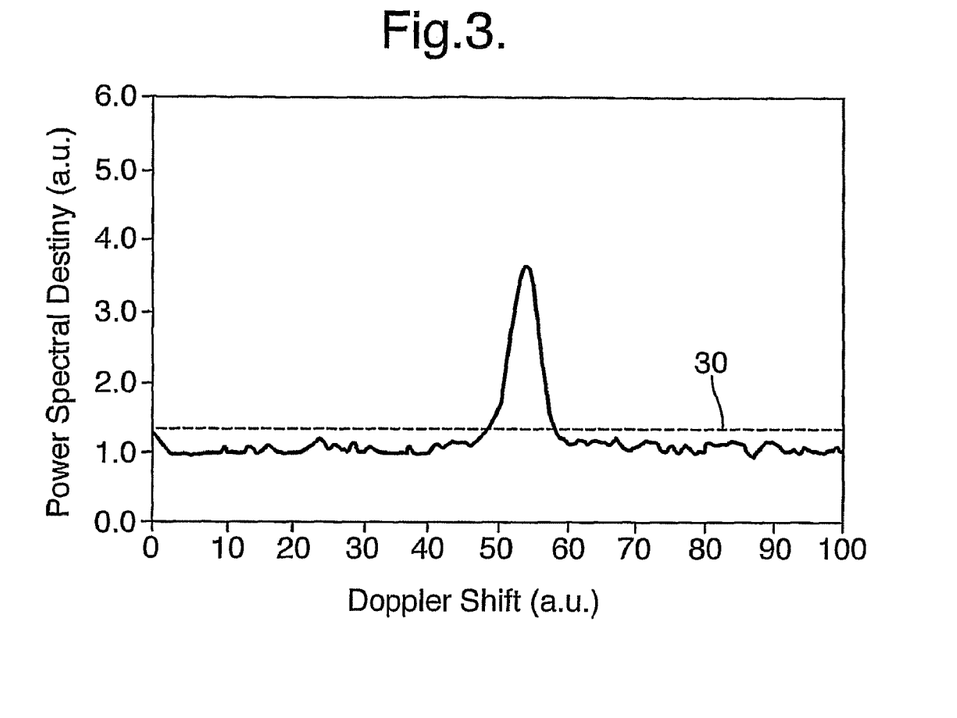
FIG. 3 shows a typical Doppler signal spectrum acquired at one position in a conical scan and from which a line of sight wind velocity value can be extracted.

FIG. 3 shows a typical example of an acquired Doppler wind spectrum. The Doppler spectrum shows the power spectral density of the return signal as a function of Doppler shifted frequency as detected over the 2.6 ms acquisition time. It can be seen that the peak in the spectrum shows an appreciable spread of wind velocities within the probe volume. If the airflow were completely uniform throughout the entire probe then all measurements would lie within only one or two "bins" of the spectrum. In fact, in FIG. 3 about ten bins contain an appreciable signal.

The line of sight wind speed is derived from the spectra of FIG. 3 by an algorithm that calculates the centroid of the spectrum above a pre-determined threshold 30. A skilled person would recognise that a number of alternative data analysis techniques, such as a peak picking routines etc, could be used. The Doppler frequency shift is then converted to velocity by multiplying by the conversion factor $\lambda/2$, or 0.775 ms$^{-1}$ per MHz: this calibration factor suffers negligible drift over extended periods (<0.2%). For narrow, well-defined spectra such as in FIG. 3 the peal-picking process gives rise to minimal uncertainty. Larger errors are likely when the air flow is more turbulent, although these can be reduced by calculating a running average.

Figure 4:
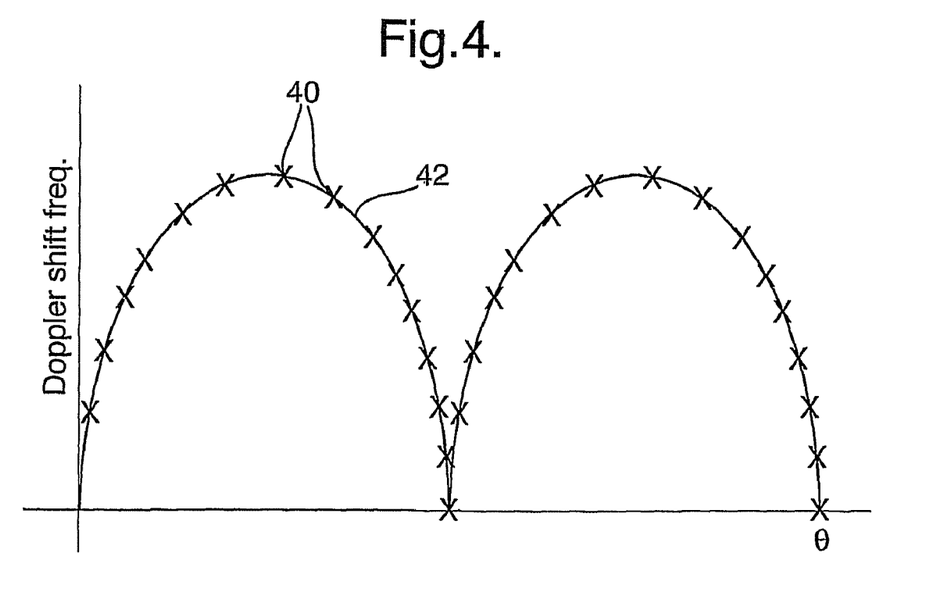
FIG. 4 shows typical wind speed data as a function of angle acquired from a conically scanned Doppler wind lidar.

FIG. 4 shows multiple line of sight wind velocity data points represented by crosses 40 and each derived from a spectrum of the type shown in FIG. 3. The wind velocity data points were acquired using a beam offset thirty degrees from the vertical and scanned in azimuth at the rate of one revolution per second. As the beam rotates, it intercepts the wind at different angles, thereby building up a map of wind speed around a disc of air.

In a uniform air flow, a plot of the Doppler line-of-sight velocity ($V_{LOS}$) versus scan angle takes the form of a rectified sine wave, with the peak Doppler values corresponding to upwind and downwind measurement. The line of sight Doppler velocity can be described as a function of scan angle ($\phi$) by:

$$V_{LOS} = |a \cos(\phi - b) + c| \quad (1)$$

where horizontal speed (u) and vertical speed (w) are given by $$u = a/\sin 30° \quad (2a)$$

$$w = c/\cos 30° \quad (2b)$$

and b is the bearing.

Fitting the acquired line of sight velocity data acquired from the conical scan to the above expression using a least sum of squares (LSS) fitting routine allows horizontal and vertical wind speed and wind bearing data to be repetitively acquired at intervals of around three seconds. The data fit is given by the solid line 42.

It should be noted that a possible ambiguity of 180° degrees in bearing can be easily resolved with reference to a simple wind-vane reading. Alternatively, the lidar could be arranged to incorporate a direction sensing function by inclusion of a means, for example an acousto-optic modulator of the type described in Harris (ibid), to frequency shift the local oscillator relative to the transmitted beam. In this latter case, the Doppler line-of-sight velocity versus scan angle would be fitted to a (non-rectified) sine curve.

Figure 5A:
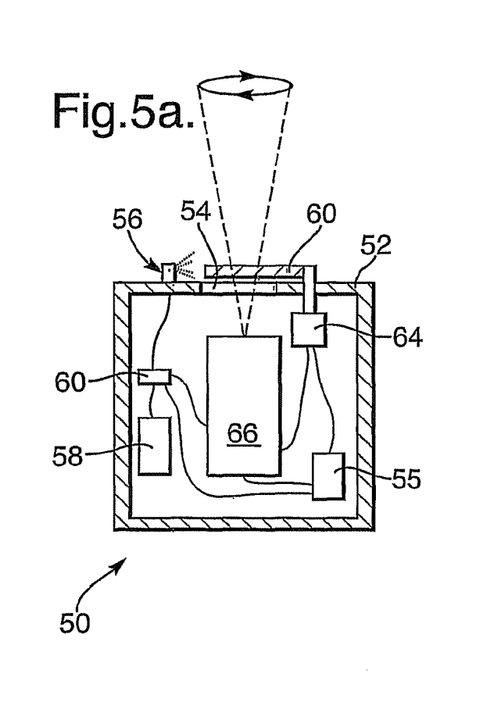
FIG. 5 shows a weatherproof lidar device of the present invention.
Figure 5B:
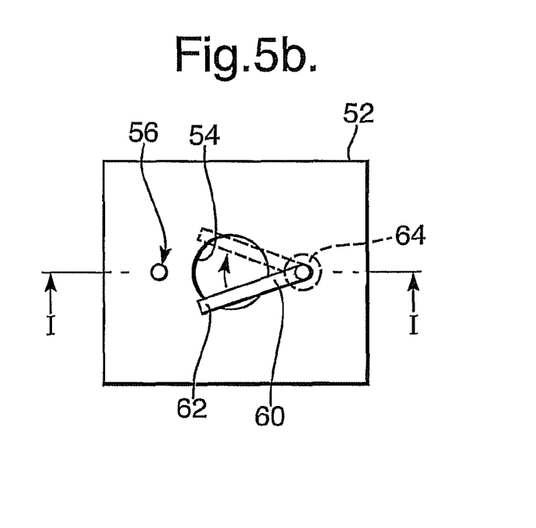

Referring now to FIGS. 5a and 5b, a weatherproof lidar device 50 of the present invention is illustrated. The device 50 comprises a housing 52 that includes a substantially transparent window 54. A washer nozzle 56 is located externally to the housing in the vicinity of the transparent window 54 and is connected by a pipe, which passes through a hole in the housing 52, to reservoir of washer fluid 58 via a battery powered pump 60. A wiper 62 is also located outside the housing 52 and is connected to a motor drive mechanism 64 via a further hole in the housing 52. The motor drive mechanism also draws power from the battery 55. The device 50 also includes a scanned lidar 66 that, is also connected to the battery 55 and is arranged such that the scanned receive and transmit beams pass through the window 54.

Waterproof seals (e.g. rubber seals) are provided to ensure any apertures in the housing (e.g. the holes required for the washer pipe and the wiper drive spindle) are substantially watertight. The window 54 is also tilted away from the horizontal by about 10° to ensure any rainwater doesn't form a pool.

Although window 54 of device 50 performs no optical function, it would be possible for the window to tale the form of a lens or other optical component (e.g. a wavelength selective filter, optical wedge etc) that performs an optical function (e.g. beam focussing) when combined with the scanned lidar. In other words, the window could form a part of the optical system of the lidar that is enclosed within the casing.

In use, the scanned lidar 66 forms co-incident transmit and receive beams that are conically scanned within a disc of air defining the remote probe volume. The focus of the lidar 66 may also be altered as necessary to control the range from the device at which wind measurements are acquired. The wiper and/or washer are activated when an appropriate control signal is output by the lidar 66.

The washer nozzle 56 is arranged such that, when activated, washer fluid is sprayed across the transparent window 54. The washer fluid may comprise water, a soap/water solution, alcohol or a standard car screen wash solution. The composition of the washer fluid will depend on the environmental conditions (e.g. operating temperature) in which the device 50 is located. The wiper 62 comprises a rubber wiper blade that is arranged, when activated, to sweep across and thereby wipe clean the portion of the window 54 through which the laser beam is transmitted/received.

Unlike prior art devices in which the wash/wipe mechanism is activated periodically, the lidar 66 is arranged to determine when a wash and/or wipe action is required by monitoring the return intensity as a function of the angle of incidence of the receive beam. A method for implementing such an "intelligent" window cleaning will now be described with reference to FIGS. 6 to 8.

Figure 6:
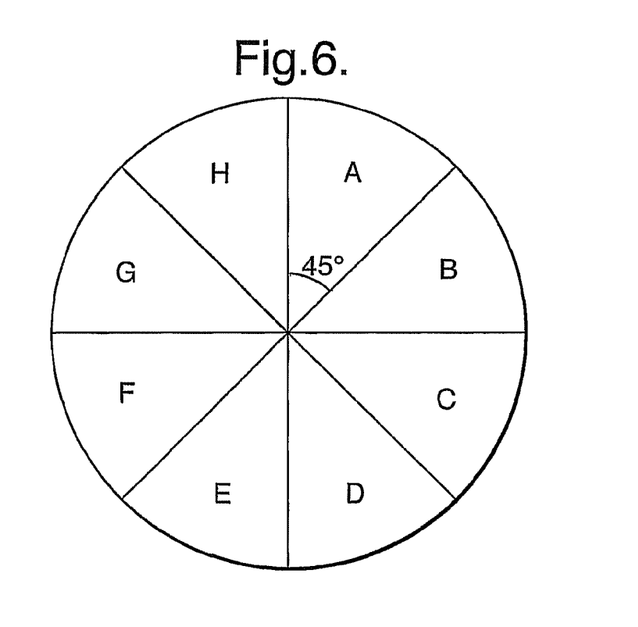
FIG. 6 illustrates an eight sector division of the laser returns from the device of FIG. 5.

Referring to FIG. 6, it can be seen how the azimuthal scan performed by the lidar to acquire wind speed data can be divided into eight sectors, A to H. Each of these sectors corresponds to a 45° portion of the conical scan performed by the lidar. For a scan that is conducted when the window is clean (i.e. free from any substantial pieces of dirt) the average signal power (i.e. the return power integrated over the Doppler spectrum) of measurements will be substantially invariant of the lidar scan angle. In other words, in normal uniform scattering conditions the average signal power is independent of azimuth and hence the average signal power will be approximately the same for measurements in each of the eight sectors.

Figure 7:
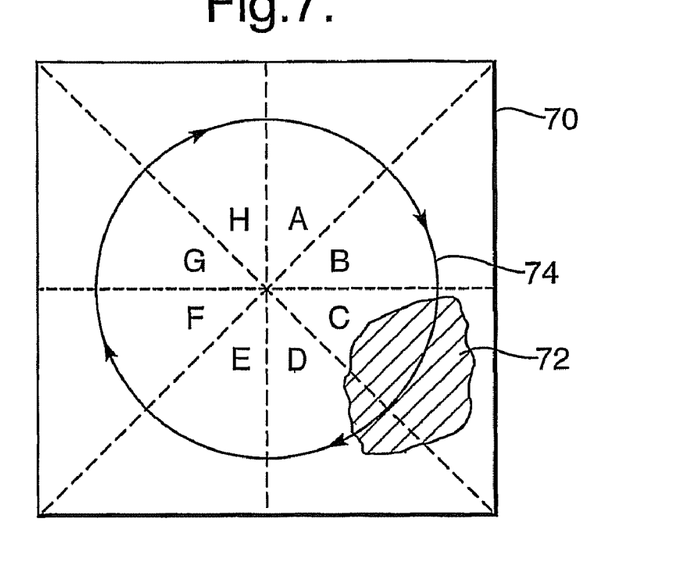
FIG. 7 shows dirt on a sector of the window of the device.

However, as shown in FIG. 7, the transparent window 70 may comprise a region of dirt 72 on part of the path 74 along which the laser beam is scanned. The dirt may arise from a variety of sources; for example, it may comprise bird droppings (i.e. bird faeces), wet leaves etc. The presence of such a region of dirt 72 will alter the amount of light transmitted through the window 70 and hence reduce the power of the return signal received by the detector of the lidar. In other words, variations in the average signal power as a function of azimuth indicates an impaired level of transmission through the window 70 and the average signal power will thus differ between sectors.

Figure 8:
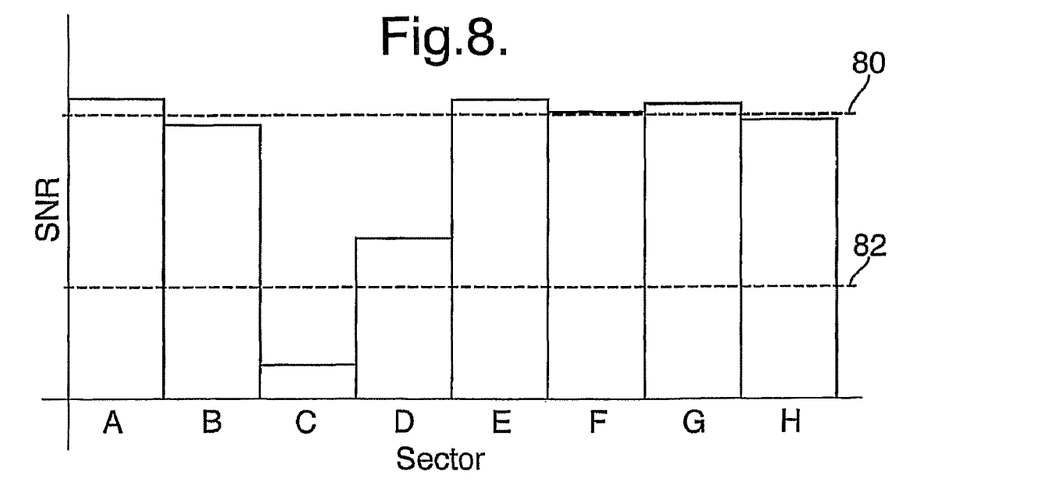
FIG. 8 illustrates the integrated intensity recorded by the lidar for the various sectors of the device shown in FIG. 7.

FIG. 8 illustrates the average signal power for measurements acquired within each of the sectors A-H shown in FIG. 7 against the previous (clean window) average signal power for all sectors (dashed line 80). To ensure transient variations in return intensity (e.g. clouds or fog moving across the field of view) do not trigger a wash/wipe operation the average signal powers shown in FIG. 8 are derived from a plurality of scans. For example, a five minute running average could be acquired. The wind speed data values arising from any Doppler spectra that are severely affect by RIN (relative intensity noise) or by high pass filtering are omitted from such a running average calculation.

From FIG. 8, it can be seen that the average signal power for sectors C and D is significantly lower than the average signal power for the other six sectors (i.e. A, B and E-H). This reduction in signal power is indicative of the presence of dirt on the window of the device. A number of data processing methods can be used to determine when there is a sufficient reduction in the average signal power to merit a wash/wipe operation. The preferred technique is to compare the sector having the maximum average signal to noise ratio (SNR) with the sector having the minimum average SNR.

In the example shown in FIG. 8, it can be seen that sector A has the highest average SNR whilst sector C has the lowest average SNR. The lidar 66 would cause a wash/wipe action to be initiated if the minimum SNR signal was below a "max/min" threshold that was half that of the maximum SNR; such a max/min threshold is shown as the dashed line 82. Although a max/min threshold of around two is suitable for most applications, it should be noted that the exact threshold level could be set as required. Instead of such a max/min thresholding technique, a simple absolute SNR threshold could be applied or the standard deviation of the average power from the different sectors could be assessed. The skilled person would also appreciate the various other ways in which the data could be analysed to achieve the same function.

To prevent signal loss due to reflections from the wiper and/or washer fluid, the lidar device is arranged such that lidar measurements are not acquired whilst the window is being cleaned. This also prevents electrical noise from the washer/ wiper motors reducing the accuracy of the lidar measurements and reduces the peak output power required from the battery of the device.

It should be noted that, as described above, a thresholding operation is performed when extracting wind speed data values from each Doppler spectrum acquired by the lidar. Therefore, any dirt that is sufficiently opaque to prevent acquisition of a useable return signal will not produce a false wind speed data value but will simply produce a "null" return. The absence of a small number of wind speed data points when performing a data fit of the type described with reference to FIG. 4 should have a negligible effect on the calculated wind speed vector. An outlier rejection technique of the type described in our co-pending international patent application GB05/001943 may also be applied when performing such a data fit. It should also be noted that such processing techniques would also ensure calculated wind speed data are not affected by returns due to movement of the wiper or application of washer fluid if it was necessary to continue data acquisition during a wash/wipe operation.

Although the above technique provides a robust way of ensuring the window is only cleaned when necessary, it should be noted that certain events may appear analogous to the presence of dirt on the external window. For example, a return signal may arise from an object in the vicinity of the lidar device, a smoke plume (e.g. from a factory building) or a persistent fog bank. The presence of such an object may be temporary (e.g. a vehicle or aircraft may pass through the region probed by the device) or it may remain in the scene for a prolonged period. Furthermore, it may not be possible for the wash/wipe system to remove certain types of persistent dirt. The lidar is thus designed to ignore any sectors having a low return intensity after N attempts to clean the window using the wash/wipe dirt mechanism. This process is implemented by performing a renormalisation operation every few hours, but more or less frequent renormalisation is possible. The device may also be arranged to "dial home" to report the presence of a persistently low signal power from a sector of the device to a remote operator; this may be achieved over an appropriate (probably wireless) data or phone link.

Figure 9A:
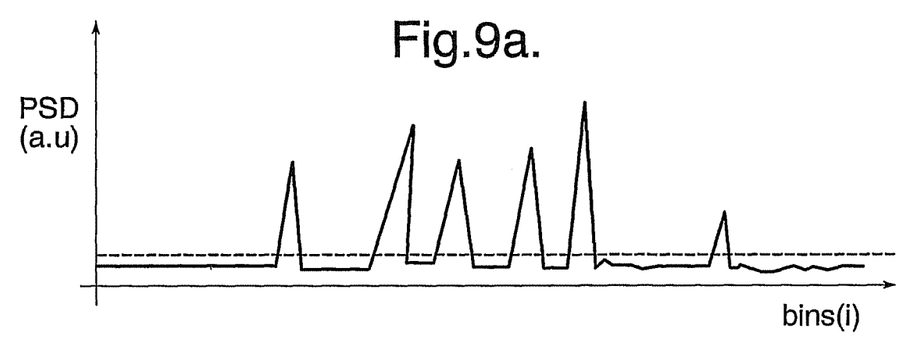
FIG. 9 illustrates how the Doppler spectra acquired by the lidar device may be analysed to determine the presence of rain.
Figure 9B:
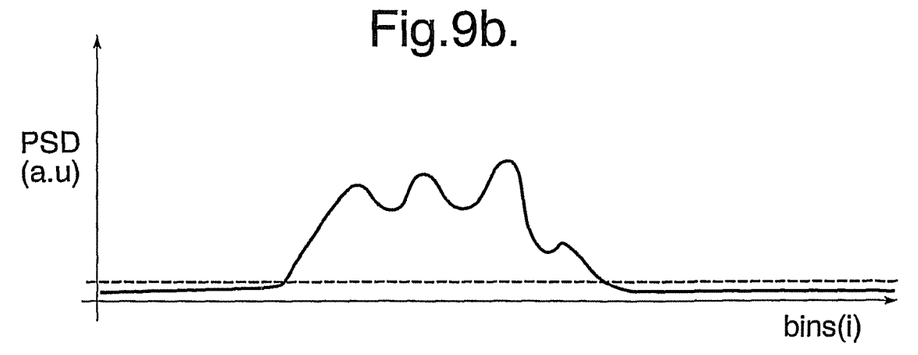

In addition, or as an alternative, to the above analysis the lidar may be arranged to trigger a window cleaning operation (e.g. a wash/wipe) in the presence of heavy rain. Referring to FIG. 9, it is shown how a typical Doppler spectra acquired in the presence of rain (FIG. 9a) is considerably more "spikey" than a standard backscatter spectrum acquired when it is not raining (FIG. 9b).

A simple measure of the "spikiness" (S) of a Doppler spectra can be determined using the expression:

$$S = \frac{\sum_i |y_{i+1} - y_i|}{\sum_i y_i} \quad (3)$$

where i is the spectra bin and $y_i$ is the signal intensity of the $i^{th}$ bin.

In the case of aerosols, S will be small but for rain S will be large. The exact threshold that identifies the presence of rain, and the threshold at which the rain becomes sufficiently heavy to merit a wash/wipe operation, will depend on the device properties. It should also be noted that S will vary with height and will also depend on the vertical (scanning) or horizontal (staring) orientation. In this example, the lidar was arranged to assess S when the lidar is focussed at a medium height (e.g. 80 m) and the S value was averaged over several second to provide a running mean "S" value.

Although equation (3) provides a simple measure of the spikiness of a Doppler spectrum, the skilled person would appreciate that many alternative mathematical functions could be used to achieve the same result. The precise function employed would depend on the processor power available and the specific application.

The presence of rain (i.e. by measuring the spikiness of Doppler spectra) may cause the lidar to produce a different output to that produced when the technique described with reference to FIGS. 6-8 indicated the presence of dirt on the window. For example, the wiper alone may be activated if it starts to rain whereas a wash/wipe action would be initiated if the presence of dirt on the window was detected. The selected action may also depend on other environmental factors; for example, washer fluid may only be applied when the temperature exceeds a certain threshold level to ensure the fluid does not freeze on the window thereby reducing (rather than enhancing) transmission through the window.

Although a wash/wipe mechanism is shown, alternative cleaning techniques could be used to clear the window in response to a signal from the lidar. For example, a film could be rolled across the external surface of the window thereby removing dirt from the window.

It should also be noted that weatherproof lidars are required for a large range of applications. The different applications are likely to impose different requirements on the weatherproof container enclosing the lidar. For example, the requirement for the container to be watertight is much less stringent for land based applications than for devices intended for use at sea. It should also be noted that the weatherproof container may be attached to, or form an integral part of, a larger article. For example, the lidar could be housed within a ship or wind turbine; the lidar would then be arranged to produce an output signal that would activate a mechanism (e.g. a wiper) to clean the window of the ship/turbine through which the laser beam of the lidar is directed.

Although a lidar for wind speed measurements is described above, the invention is equally application to any laser system in which a beam of radiation is moved or scanned across an output window. For example, the technique could be used with ceilometers, scanned differential absorption lidar (DIAL) systems, range profiling lidars etc. Non-lidar based laser systems could also employ the invention.

The invention claimed is:

1. A measurement device comprising a transmitter portion for transmitting radiation to a plurality of points within a remote probe volume through a window portion, a receiver portion for detecting radiation returned through said window portion from the remote probe volume and a processor for analysing the detected return radiation, said window portion having associated window cleaning apparatus for cleaning said window portion in response to a cleaning activation signal, wherein the processor is arranged to determine the average return power of detected return radiation collected from each of a plurality of mutually exclusive angular segments, each angular segment corresponding to a range of angles of transmission of radiation from the device and to generate a cleaning activation signal for activating window cleaning apparatus when the power of detected return radiation varies as a function of the angle of transmission of radiation from the device.

2. A device according to claim 1 wherein the transmitter portion comprises a scanning mechanism.

3. A device according to claim 1 wherein said plurality of angular segments comprises at least 4 angular segments.

4. A device according to claim 1 in which the processor is arranged to determine a first angular segment having the highest average return power and a second angular segment having the lowest average return power, wherein the processor generates a cleaning activation signal if the average return power of the first angular segment substantially exceeds the average return power of the second angular segment.

5. A device according to claim 4 wherein a cleaning activation signal is produced if the average return power of the first angular segment exceeds the average return power of the second angular segment by a factor greater than two.

6. A device according to claim 1 in which the processor is arranged to calculate the standard deviation of the average return power for each segment from the mean average return intensity of all segments, wherein a cleaning activation signal is produced if the standard deviation exceeds a predetermined value.

7. A device according to claim 1 wherein the processor is arranged to determine the normalised return power for each measurement, said normalised return power being calculated from the power of the detected return and an associated return power reference value.

8. A device according to claim 1 wherein the processor is arranged to output an error signal if a cleaning activation signal is persistently generated.

9. A device according to claim 1 comprising communication means for contacting a remote centre.

10. A device according to claim 1 wherein the transmit beam formed by the transmitter portion and the receive beam defined by the receiver portion are arranged to continually intersect in the remote probe volume during use.

11. A device according to claim 1 wherein said transmitter portion and said receiver portion comprise a monostatic transceiver.

12. A device according to claim 1 wherein the processor is arranged to determine any Doppler shift of return radiation detected by the receiver portion.

13. A device according to claim 12 wherein the processor is arranged to calculate wind speed from the Doppler shift of backscattered radiation collected by the receiver portion.

14. A device according to claim 12 wherein the processor is arranged to analyse the Doppler power spectrum of each measurement for the presence of rain.

15. A device according to claim 14 wherein analysis of the Doppler spectrum comprises analysing the "spikiness" of each Doppler spectrum.

16. A device according to claim 1 wherein the transmitter portion, in use, transmits continuous wave radiation to the remote probe volume.

17. A device according to claim 1 wherein the transmitter portion, in use, transmits pulsed radiation to the remote probe volume.

18. A weatherproof device comprising a device according to claim 1 and a weatherproof housing, said weatherproof housing comprising a substantially transparent window portion and a window cleaning mechanism wherein the device is arranged to transmit and receive radiation through the window portion of the weatherproof housing.

19. A weatherproof device according to claim 18 wherein the window cleaning mechanism comprises a wash and wipe mechanism.

20. A method of acquiring a measurement comprising the steps of;
(i) transmitting and scanning radiation to a plurality of points within a remote probe volume,
(ii) detecting radiation returned from the remote probe volume,
(iii) analysing the detected return radiation using a processor to determine the average return power of detected return radiation collected from each of a plurality of mutually exclusive angular segments, each angular segment corresponding to a range of angles of transmission of radiation from the device; and
(iv) generating a cleaning activation signal for activating window cleaning apparatus when the power of the detected return radiation varies as a function of the angle of transmission of radiation from the device wherein steps (i) and (ii) further comprise transmitting and receiving radiation through a window portion having associated window cleaning apparatus for cleaning said window portion in response to a cleaning activation signal.

* * * * *